United States Patent
Deng

(10) Patent No.: US 10,693,336 B2
(45) Date of Patent: Jun. 23, 2020

(54) WINDING CONFIGURATION ELECTRIC MOTOR

(71) Applicant: WHIRLPOOL CORPORATION, Benton Harbor, MI (US)

(72) Inventor: Fang Deng, Stevensville, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 354 days.

(21) Appl. No.: 15/612,178

(22) Filed: Jun. 2, 2017

(65) Prior Publication Data
US 2018/0351426 A1 Dec. 6, 2018

(51) Int. Cl.
*H02K 3/28* (2006.01)
*H02K 1/14* (2006.01)
*H02K 3/18* (2006.01)

(52) U.S. Cl.
CPC ............. *H02K 3/28* (2013.01); *H02K 1/146* (2013.01); *H02K 3/18* (2013.01)

(58) Field of Classification Search
CPC ........... H02K 1/146; H02K 3/18; H02K 3/20; H02K 3/28; H02K 3/46; H02K 3/48
USPC .......... 310/195, 198, 208, 216.071, 216.072, 310/216.073, 216.096
See application file for complete search history.

(56) References Cited

U.S. PATENT DOCUMENTS

| | | |
|---|---|---|
| 2,394,075 A | 2/1946 | Kimball |
| 3,194,032 A | 7/1965 | Von Brimer |
| 3,223,043 A | 12/1965 | Shapiro |
| 3,320,451 A | 5/1967 | Wiley |
| 3,444,402 A | 5/1969 | Cartier |
| 3,521,100 A | 7/1970 | Tamm |
| 4,007,386 A | 2/1977 | Rustecki |
| 4,007,387 A | 2/1977 | Rustecki |
| 4,187,441 A | 2/1980 | Oney |
| 4,341,971 A * | 7/1982 | Tohara ................... H02K 23/30 310/180 |

(Continued)

FOREIGN PATENT DOCUMENTS

| CN | 1173063 | 2/1998 |
|---|---|---|
| CN | 202524190 | 11/2012 |

(Continued)

OTHER PUBLICATIONS

Ishak, Dahaman; Zhu, Z. Q.; Howe, David, "Permanent-Magnet Brushless Machines With Unequal Tooth Widths and Similar Slot and Pole Numbers," IEEE Transactions on Industry Applications, vol. 41, No. 2, Mar./Apr. 2005.

*Primary Examiner* — Jeremy A Luks
(74) *Attorney, Agent, or Firm* — Price Heneveld LLP

(57) ABSTRACT

A stator assembly for a permanent magnet motor is disclosed. The assembly comprises a yoke comprising a plurality of teeth in connection therewith and extending into an opening formed by the yoke. The plurality of teeth comprises a first tooth and a second tooth. The first tooth is arranged adjacent to the second tooth about a rotational axis of the motor. The assembly further comprises a first coil and a second coil. The first coil comprises a first conductive winding having a first number of turns disposed around the first tooth, and the second coil comprises a second conductive winding having a second number of turns disposed around the second tooth. The first number of turns is different from the second number of turns.

9 Claims, 4 Drawing Sheets

(56) References Cited

U.S. PATENT DOCUMENTS

| | | |
|---|---|---|
| 4,392,072 A | 7/1983 | Rosenberry |
| 4,392,073 A | 7/1983 | Rosenberry, Jr. |
| 4,403,401 A | 9/1983 | Rosenberry |
| 4,423,345 A | 12/1983 | Nilsson |
| 4,567,391 A | 1/1986 | Tucker et al. |
| 4,568,862 A | 2/1986 | Tassinario |
| 4,623,812 A | 11/1986 | Van de Griend |
| 4,644,208 A | 2/1987 | Laing |
| 4,813,126 A | 3/1989 | Williamson |
| 4,843,269 A | 6/1989 | Shramo |
| 4,910,861 A | 3/1990 | Dohogne |
| 4,930,201 A | 6/1990 | Brown |
| 4,956,139 A | 9/1990 | Koizumi et al. |
| 4,973,868 A | 11/1990 | Wust |
| 4,973,872 A | 11/1990 | Dohogne |
| 4,978,281 A | 12/1990 | Conger, IV |
| 5,045,742 A | 9/1991 | Armstrong et al. |
| 5,329,199 A | 7/1994 | Yockey et al. |
| 5,528,095 A | 6/1996 | Strobl |
| 5,574,342 A * | 11/1996 | Okamoto ............... H02K 29/03 310/179 |
| 5,578,885 A | 11/1996 | Alford et al. |
| 5,672,405 A | 9/1997 | Plank, Jr. et al. |
| 5,818,144 A | 10/1998 | Kim |
| 5,866,964 A | 2/1999 | Li |
| 5,907,206 A | 5/1999 | Shiga et al. |
| 5,909,072 A * | 6/1999 | Muller ................... H02K 1/146 310/173 |
| 5,986,376 A * | 11/1999 | Werson ................. H02K 29/03 310/179 |
| 6,127,760 A | 10/2000 | Nagasaki et al. |
| 6,144,131 A | 11/2000 | Hollenbeck et al. |
| 6,148,647 A | 11/2000 | Kabeya et al. |
| 6,175,177 B1 | 1/2001 | Sabinski et al. |
| 6,257,027 B1 | 7/2001 | Imai |
| 6,285,104 B1 | 9/2001 | Nashiki |
| 6,370,761 B2 | 4/2002 | Shiga et al. |
| 6,396,177 B1 | 5/2002 | Shin et al. |
| 6,445,105 B1 | 9/2002 | Kliman et al. |
| 6,460,382 B1 | 10/2002 | Kim et al. |
| 6,477,869 B2 | 11/2002 | Heyder et al. |
| 6,504,283 B1 | 1/2003 | Asao et al. |
| 6,510,716 B1 | 1/2003 | Kim et al. |
| 6,511,232 B1 | 1/2003 | Ishii et al. |
| 6,564,594 B1 | 5/2003 | Ito et al. |
| 6,664,703 B2 | 12/2003 | Oketani et al. |
| 6,729,011 B2 | 5/2004 | Asao et al. |
| 6,744,157 B2 | 6/2004 | Choi et al. |
| 6,849,982 B2 | 2/2005 | Haydock et al. |
| 6,880,229 B2 | 4/2005 | Zepp et al. |
| 6,892,439 B1 | 5/2005 | Neal et al. |
| 6,929,575 B2 | 8/2005 | Takahashi et al. |
| 6,992,419 B2 | 1/2006 | Kim et al. |
| 7,015,606 B2 | 3/2006 | Huang et al. |
| 7,114,355 B2 | 10/2006 | Kim et al. |
| 7,141,905 B2 | 11/2006 | Vollmer |
| RE39,416 E | 12/2006 | Shin et al. |
| 7,196,446 B2 | 3/2007 | Hans |
| 7,200,917 B2 | 4/2007 | Takano et al. |
| 7,247,967 B2 | 7/2007 | Ionel et al. |
| 7,356,906 B2 | 4/2008 | Kim et al. |
| 7,380,424 B2 | 6/2008 | Kim et al. |
| 7,397,158 B2 | 7/2008 | Lee et al. |
| 7,415,849 B2 | 8/2008 | Kim et al. |
| 7,441,421 B2 | 10/2008 | Kim et al. |
| 7,443,074 B2 | 10/2008 | Kim et al. |
| 7,449,137 B2 | 11/2008 | Staargaard et al. |
| 7,520,148 B2 | 4/2009 | Choi |
| 7,569,633 B2 | 8/2009 | Koizumi |
| 7,640,771 B2 | 1/2010 | Fechtel et al. |
| 7,692,342 B2 | 4/2010 | Ahn |
| 7,698,803 B2 | 4/2010 | Mitsui et al. |
| 7,755,228 B2 | 7/2010 | Kim et al. |
| 7,969,104 B2 * | 6/2011 | Taniguchi ............... B62D 5/046 310/198 |
| 7,997,103 B2 | 8/2011 | Kim et al. |
| 8,011,211 B2 | 9/2011 | Ahn |
| 8,030,808 B2 | 10/2011 | Zhang |
| 8,080,907 B2 | 12/2011 | Jeung |
| 8,179,016 B2 | 5/2012 | Asano |
| 8,191,389 B2 | 6/2012 | Kim et al. |
| 8,220,295 B2 | 7/2012 | Choi et al. |
| 8,344,568 B2 | 1/2013 | Bailey et al. |
| 8,344,584 B2 | 1/2013 | Ahn et al. |
| 8,353,216 B2 | 1/2013 | Giordano et al. |
| 8,358,045 B2 | 1/2013 | Van Heyden et al. |
| 8,395,293 B2 | 3/2013 | Marchitto |
| 8,461,739 B2 | 6/2013 | Liang et al. |
| 8,482,176 B2 | 7/2013 | Bailey et al. |
| 8,497,615 B2 * | 7/2013 | Kimura ................... H02K 3/28 310/179 |
| 8,539,665 B2 | 9/2013 | Dokonal et al. |
| 8,552,601 B2 | 10/2013 | Mizukami et al. |
| 8,567,043 B2 | 10/2013 | Horst et al. |
| 8,578,741 B2 | 11/2013 | Gillo et al. |
| 8,621,896 B2 | 1/2014 | Kim et al. |
| 8,677,789 B2 | 3/2014 | Gracia Bobed et al. |
| 8,716,912 B2 | 5/2014 | Bailey et al. |
| 8,749,111 B2 | 6/2014 | Lee |
| 8,754,605 B2 * | 6/2014 | Ramu ...................... H02K 1/24 318/700 |
| 8,978,425 B2 | 3/2015 | Lee |
| 8,987,955 B2 | 3/2015 | Mizukami et al. |
| 8,997,533 B2 | 4/2015 | Kim et al. |
| 9,054,571 B2 | 6/2015 | Dokonal et al. |
| 9,071,090 B2 | 6/2015 | Watanabe et al. |
| 9,080,279 B2 | 7/2015 | Jun et al. |
| 9,085,846 B2 | 7/2015 | Garlatti |
| 9,130,441 B2 | 9/2015 | Okada |
| 9,206,540 B2 | 12/2015 | Lim et al. |
| 9,212,445 B2 | 12/2015 | Erickson |
| 9,312,743 B2 | 4/2016 | Kim et al. |
| 9,328,447 B2 | 5/2016 | Kim et al. |
| 9,376,767 B2 | 6/2016 | Quandt et al. |
| 9,392,925 B2 | 7/2016 | Kim |
| 9,401,631 B2 | 7/2016 | Wu et al. |
| 9,472,997 B2 | 10/2016 | Figgins et al. |
| 9,479,022 B2 | 10/2016 | Hoemann et al. |
| 9,493,899 B2 | 11/2016 | Lee |
| 9,545,467 B2 | 1/2017 | Wampler et al. |
| 9,577,554 B2 | 2/2017 | Kim et al. |
| 9,644,304 B2 | 5/2017 | Kim et al. |
| 9,673,678 B2 | 6/2017 | Okada et al. |
| 9,800,116 B2 | 10/2017 | Iwai et al. |
| 9,800,117 B2 | 10/2017 | Iwai |
| 9,896,794 B2 | 2/2018 | Kim |
| 9,923,493 B2 | 3/2018 | Matsuoka et al. |
| 9,976,243 B2 | 5/2018 | Kim et al. |
| 9,988,752 B2 | 6/2018 | Kim et al. |
| 2003/0214198 A1 | 11/2003 | Harada et al. |
| 2005/0034491 A1 | 2/2005 | Tazawa et al. |
| 2005/0073210 A1 | 4/2005 | Rocky et al. |
| 2006/0042022 A1 | 3/2006 | Kim et al. |
| 2006/0076845 A1 | 4/2006 | Park et al. |
| 2006/0119204 A1 | 6/2006 | Awazu et al. |
| 2007/0068199 A1 | 3/2007 | Dahlmann et al. |
| 2007/0132323 A1 | 6/2007 | Park |
| 2007/0138902 A1 | 6/2007 | Ahn et al. |
| 2007/0138904 A1 | 6/2007 | Chae |
| 2007/0289341 A1 | 12/2007 | Hollenhorst et al. |
| 2008/0024019 A1 | 1/2008 | Sakuma et al. |
| 2009/0085422 A1 | 4/2009 | Kusawake et al. |
| 2009/0193855 A1 | 8/2009 | Park et al. |
| 2010/0141079 A1 | 6/2010 | Chu et al. |
| 2010/0206015 A1 | 8/2010 | Mancini et al. |
| 2010/0287995 A1 | 11/2010 | Mancini et al. |
| 2011/0001400 A1 | 1/2011 | Chiba et al. |
| 2011/0121668 A1 | 5/2011 | Condamin et al. |
| 2012/0006070 A1 | 1/2012 | Song et al. |
| 2012/0007481 A1 | 1/2012 | Filippetti et al. |
| 2013/0009513 A1 | 1/2013 | Jang et al. |
| 2013/0014545 A1 | 1/2013 | Ushijima et al. |
| 2013/0049512 A1 | 2/2013 | Jung |
| 2013/0055771 A1 | 3/2013 | Tashiro et al. |

(56) References Cited

U.S. PATENT DOCUMENTS

| | | |
|---|---|---|
| 2013/0106237 A1 | 5/2013 | Jang et al. |
| 2013/0214637 A1 | 8/2013 | Hill et al. |
| 2013/0327098 A1 | 12/2013 | Bae et al. |
| 2014/0084734 A1 | 3/2014 | Ishigami et al. |
| 2014/0084736 A1* | 3/2014 | Makita .................. H02K 21/16 310/198 |
| 2014/0125189 A1 | 5/2014 | Hoemann |
| 2014/0139067 A1 | 5/2014 | Neuenschwander et al. |
| 2014/0167531 A1 | 6/2014 | Hangmann |
| 2014/0175912 A1 | 6/2014 | Germann et al. |
| 2014/0232214 A1 | 8/2014 | Bailey et al. |
| 2015/0008769 A1 | 1/2015 | Uchitani |
| 2015/0033802 A1 | 2/2015 | Kleinmanns et al. |
| 2015/0076954 A1 | 3/2015 | Johnson et al. |
| 2015/0076955 A1 | 3/2015 | Hoemann |
| 2015/0207371 A1 | 7/2015 | Duncan et al. |
| 2015/0252507 A1 | 9/2015 | Kim et al. |
| 2015/0256056 A1 | 9/2015 | Kim et al. |
| 2015/0318744 A1 | 11/2015 | Ekin et al. |
| 2015/0368849 A1 | 12/2015 | Pessot et al. |
| 2016/0130739 A1 | 5/2016 | Song |
| 2016/0160961 A1 | 6/2016 | Biro et al. |
| 2016/0197524 A1 | 7/2016 | Bastien |
| 2016/0201246 A1 | 7/2016 | Song et al. |
| 2016/0215436 A1 | 7/2016 | Gasparini |
| 2016/0238011 A1 | 8/2016 | Lambert et al. |
| 2016/0241105 A1 | 8/2016 | Moore et al. |
| 2016/0244905 A1 | 8/2016 | Lv et al. |
| 2016/0245580 A1 | 8/2016 | Brownlow |
| 2016/0348295 A1 | 12/2016 | Bae et al. |
| 2016/0376741 A1 | 12/2016 | Kim et al. |
| 2017/0008403 A1 | 1/2017 | Yazdanpanah et al. |
| 2017/0044705 A1 | 2/2017 | Kim et al. |
| 2017/0122646 A1 | 5/2017 | Kuehl et al. |
| 2017/0179775 A1 | 6/2017 | Kim et al. |
| 2017/0191203 A1 | 7/2017 | Kim et al. |
| 2017/0204551 A1 | 7/2017 | Kim et al. |
| 2017/0268150 A1 | 9/2017 | Lv et al. |
| 2018/0030638 A1 | 2/2018 | Nakagawa et al. |

FOREIGN PATENT DOCUMENTS

| | | |
|---|---|---|
| DE | 9215811 | 2/1993 |
| DE | 19818433 A1 | 11/1998 |
| EP | 1116812 | 7/2001 |
| EP | 1431439 | 6/2004 |
| EP | 2159314 | 3/2010 |
| EP | 3316458 | 5/2018 |
| GB | 2189511 | 10/1987 |
| GB | 2325787 B | 12/1999 |
| JP | 59110347 | 6/1984 |
| JP | 2000253602 A | 9/2000 |
| JP | 23447599 | 2/2001 |
| JP | 2007104795 | 4/2007 |
| WO | 200122560 | 3/2001 |
| WO | 2006001639 | 1/2006 |
| WO | 2006052073 | 5/2006 |
| WO | 2006054842 | 5/2006 |
| WO | 2006064860 | 6/2006 |
| WO | 2007108588 | 9/2007 |
| WO | 2007129352 | 11/2007 |
| WO | 2007132955 | 11/2007 |
| WO | 2009017430 | 2/2009 |
| WO | 2009040302 | 4/2009 |
| WO | 2011141958 | 11/2011 |
| WO | 2014114942 | 7/2014 |

\* cited by examiner

WINDING CONFIGURATION ELECTRIC MOTOR

BACKGROUND OF THE INVENTION

The present device generally relates to an electric motor and more specifically relates to a stator assembly for a permanent magnet electric motor.

SUMMARY OF THE INVENTION

In at least one aspect, the disclosure provides for a stator for a permanent magnet motor. The stator comprises a yoke comprising an outer support and forming an opening. A first tooth extends into the opening and comprises a first stem portion and a first arc portion. The first arc portion extends from the first stem portion over a first extension length. The first extension length is configured to accommodate a first number of turns of a first stator coil. A second tooth extends into the opening adjacent the first tooth and comprises a second stem portion and a second arc portion. The second arc portion extends from the second stem portion over a second extension length. The second extension length is configured to accommodate a second number of turns of a second stator coil. The first extension length is different than the second extension length. The difference in the extension lengths is based on a turn ratio between the first number of turns to the second number of turns.

In at least another aspect, a stator assembly for a permanent magnet motor is disclosed. The assembly comprises a yoke forming an outer support. A plurality of teeth is in connection with the yoke and extends into an opening formed by the yoke. The plurality of teeth comprises a first tooth and a second tooth. The first tooth is arranged adjacent to the second tooth about a rotational axis of the motor. The assembly further comprises a first coil and a second coil. The first coil comprises a first conductive winding having a first number of turns disposed around the first tooth, and the second coil comprises a second conductive winding having a second number of turns disposed around the second tooth. The first number of turns is different from the second number of turns.

In at least another aspect, a stator assembly for a permanent magnet motor is disclosed. The assembly comprises a yoke forming an outer support. A plurality of teeth is in connection with the yoke and extends into an opening formed by the yoke. The plurality of teeth comprises a first tooth and a second tooth. The first tooth is arranged adjacent to the second tooth about a rotational axis of the motor. The assembly further comprises a first coil comprising a first conductive winding having a first number of turns disposed around the first tooth, and a second coil comprising a second conductive winding having a second number of turns disposed around the second tooth. The first number of turns is different from the second number of turns. The first coil comprises a first winding phase and the second coil comprises a second winding phase different from the first winding phase.

These and other features, advantages, and objects of the present device will be further understood and appreciated by those skilled in the art upon studying the following specification, claims, and appended drawings.

DETAILED DESCRIPTION OF EMBODIMENTS

Figure 1:
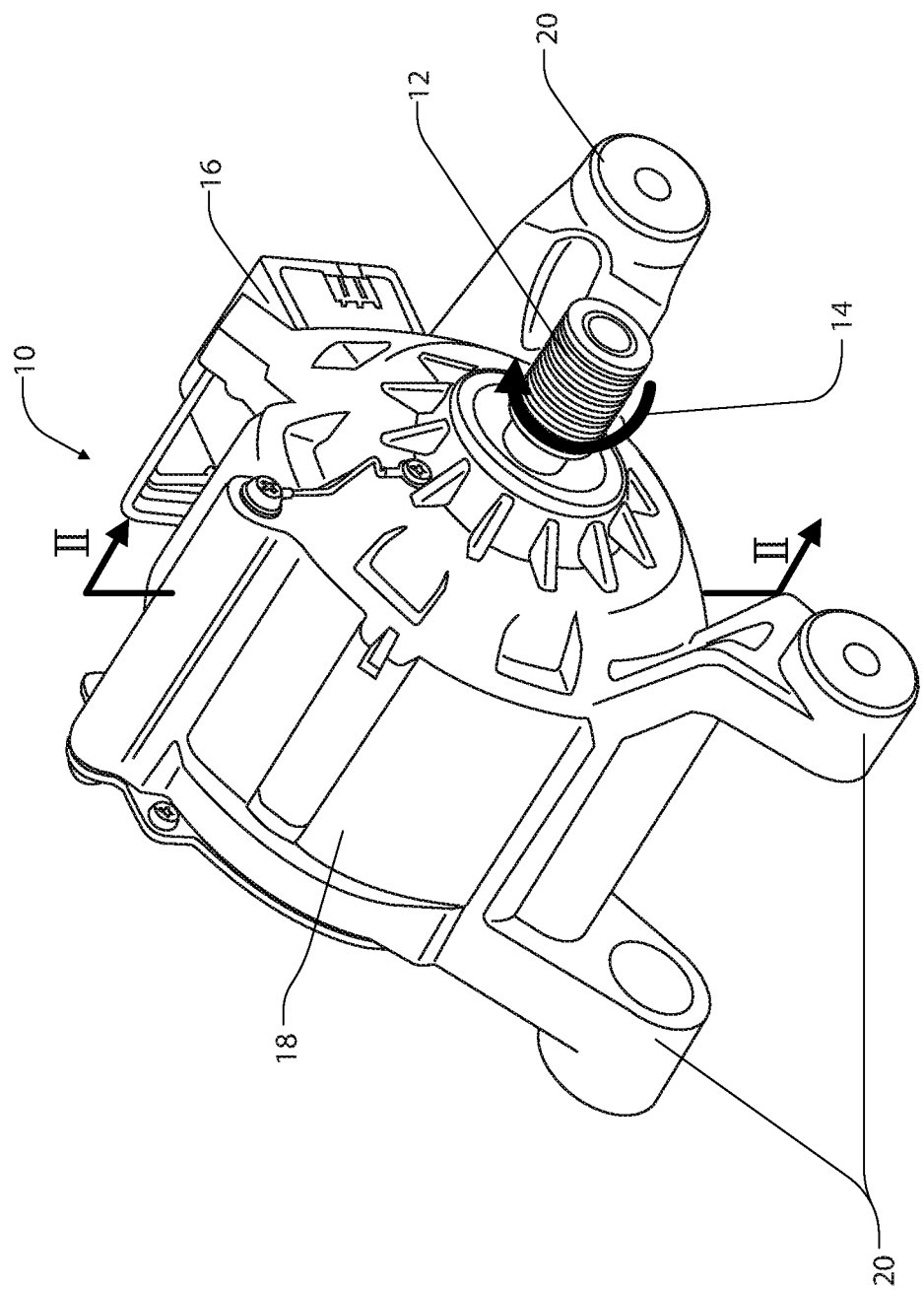
FIG. 1 is a projected view of an electric motor.

For purposes of description herein, the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to the embodiment illustrated in FIG. 1, a projected view of a motor 10 is shown. The motor 10 may correspond to a brushless permanent magnet (BPM) motor or a permanent magnet synchronous motor (PMSM). In various embodiments, the motor 10 may be configured to operate at high efficiency and interconnect via a motor shaft 12 to a pulley. Additionally, the motor shaft 12 may be coupled to a rotating assembly in a direct drive configuration. Accordingly, the motor 10 may be utilized in a variety of applications in accordance with the disclosure.

In an exemplary embodiment, the motor 10 may be configured to drive an operation of an appliance. For example, the motor 10 may be configured to power various devices including, but not limited to, compressors, fans, pumps, and washers. In some embodiments, the motor 10 may be configured to drive a rotational motion 14 of a washer drum of a washing machine. The motor 10 may be applied in a washer, dryer, or various appliances or machines and may be particularly beneficial in high-speed operations. The motor 10 may comprise an electrical connection 16, which may further be connected to a power supply, controller, or various forms of drive circuits. In this configuration, the motor 10 may be driven or operated by a controlled application of current signals to windings of a stator as illustrated and further discussed in reference to FIG. 2. As discussed further herein, the stator may comprise a beneficial winding configuration configured to improve efficiency during high-speed operation.

As illustrated in FIG. 1, the motor 10 may comprise a housing 18, which may comprise a plurality of mounting structures 20. The mounting structures 20 may be configured to engage a frame or structural supports to position and/or align the motor 10. In this configuration, the motor 10 may be positioned for alignment with a belt assembly or in connection with a coupler. Accordingly, the motor 10 may be utilized in a variety of applications without departing from the spirit of the disclosure.

Figure 2:
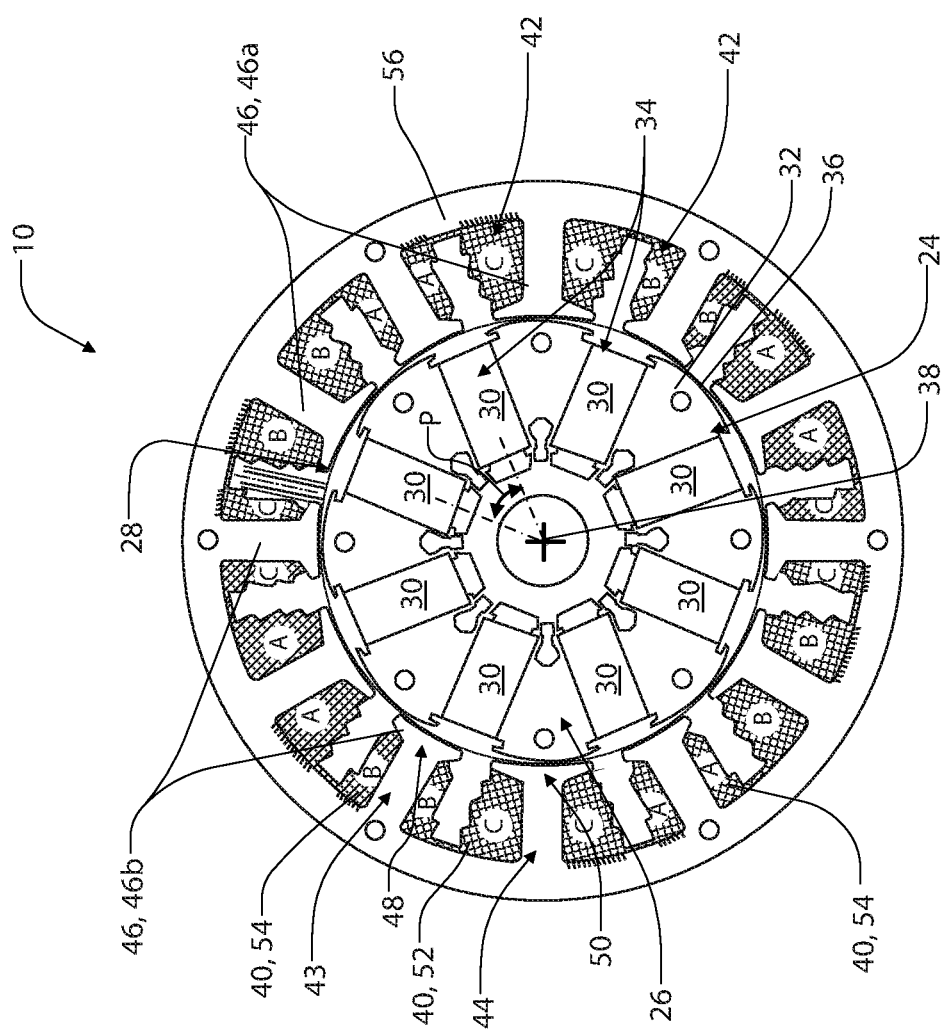
FIG. 2 is a cross-sectional view of a stator and a rotor of the electric motor demonstrated in FIG. 1 along section line II-II.

Referring now to FIG. 2, a cross sectional view along section line II-II demonstrated in FIG. 1 is shown. The cross-sectional view demonstrates an exemplary embodiment of a stator 22 and a rotor 24 of the motor 10 in accordance with the disclosure. The stator 22 may correspond to a concentrated winding stator forming a cylindrical opening 26 configured to receive the rotor 24 separated by an air gap 28. The rotor 24 may comprise a plurality of permanent magnets 30 disposed in a plurality of rotor slots 34 formed by a rotor core 32 of the rotor 24. In this configuration, the permanent magnets 30 and the rotor core 32 may form a magnetic structure attached to the motor shaft 12.

As shown, the permanent magnets 30 are inset within the rotor core 32. Though demonstrated as being disposed within the slots 34 of the rotor 24, the permanent magnets 30 may be attached to an exterior surface 36 of the rotor core 32. The permanent magnets 30 may be evenly distributed about a rotational axis 38 of the rotor 24 forming a pole pitch P. The pole pitch P in the exemplary embodiment is 45 degrees. However, the pole pitch P may vary depending on the number of permanent magnets 30 implemented in the rotor 24. For example, in an embodiment of the rotor 24 comprising 6 permanent magnets 30, the pole pitch may be 60 degrees.

During operation, the permanent magnets 30 generate a flux density distribution across the air gap 28. The main flux density of the rotor 24 is produced by the magnets 30. In various embodiments, the magnets 30 do not carry current from the operation of the motor 10. Accordingly, the losses incurred during operation of the motor 10 may be limited to losses in the rotor core 32 and the stator 22. For this reason, the motor 10 is suitable for applications where high efficiency is a concern. In addition to these benefits, the motor 10 may comprise a unique design and implement a plurality of stator coils 40 of the stator 22.

More specifically, the disclosure may provide for the stator 22 design to have a configuration that is particularly effective in achieving efficient, high-speed operation of the motor 10. The stator 22 may comprise a hybrid winding configuration of the stator coils 40. The hybrid winding configuration comprises an uneven distribution or alternating number of turns N of the windings 42 in adjacent or neighboring stator coils 40. The stator coils 40 may each be enclosed about a stem portion 43 forming a proximal end portion 44 of each tooth 46. Each tooth 46 may further comprise an arc portion 48 forming a distal end portion 50.

In an exemplary embodiment, the hybrid configuration of the coils 40 comprises an alternating configuration of a full coil 52 on a first tooth 46a and a partial coil 54 on a second tooth 46b. The full coil 52 may comprise a first number of turns N1, and the partial coil 54 may comprise a second number of turns N2. The first number of turns N1 of the full coil 52 may be greater than the second number of turns N2 of the partial coil 54. In this configuration, the stator 22 may provide for improved efficiency for high-speed operation through reduced current draw.

As demonstrated, each of the coils 54 may be connected to a winding phase A, B, and C of the motor 10. The winding phases may be evenly distributed angularly about a yoke 56 of the stator 22. For example, each of the winding phases A, B, and C (three phases in this example) may be connected in a repeating order to the teeth 46 extending from the yoke 56 of the stator 22. In this configuration, each of the windings 42 is connected to a corresponding phase of the winding phases A, B, and C, and the phases may be in conductive connection with the electrical connection 16 configured to supply driving current to the coils 54. In operation, the current may be applied to each of the winding phases A, B, and C in an offset phase timing, which may result in the rotational motion 14 of the rotor 24 and, consequently, a rotation of the motor shaft 12.

The hybrid configuration of the coils 40 as discussed herein may increase the efficiency of operation of the motor 10 by reducing current draw during operation. The reduced current draw may further lead to a reduction in temperature rise during operation that may result due to conductive losses, which increase at increased operating currents. Additionally, the hybrid configuration is particularly flexible and allows for high efficiency for differing bus voltage levels that may vary based on various applications and a geographic region of operation. Accordingly, the improved flexibility of the motor 10 may provide for reduced manufacturing cost resulting in limited variation that may otherwise result from manufacturing different motors for different applications and geographic locations.

Figure 3:
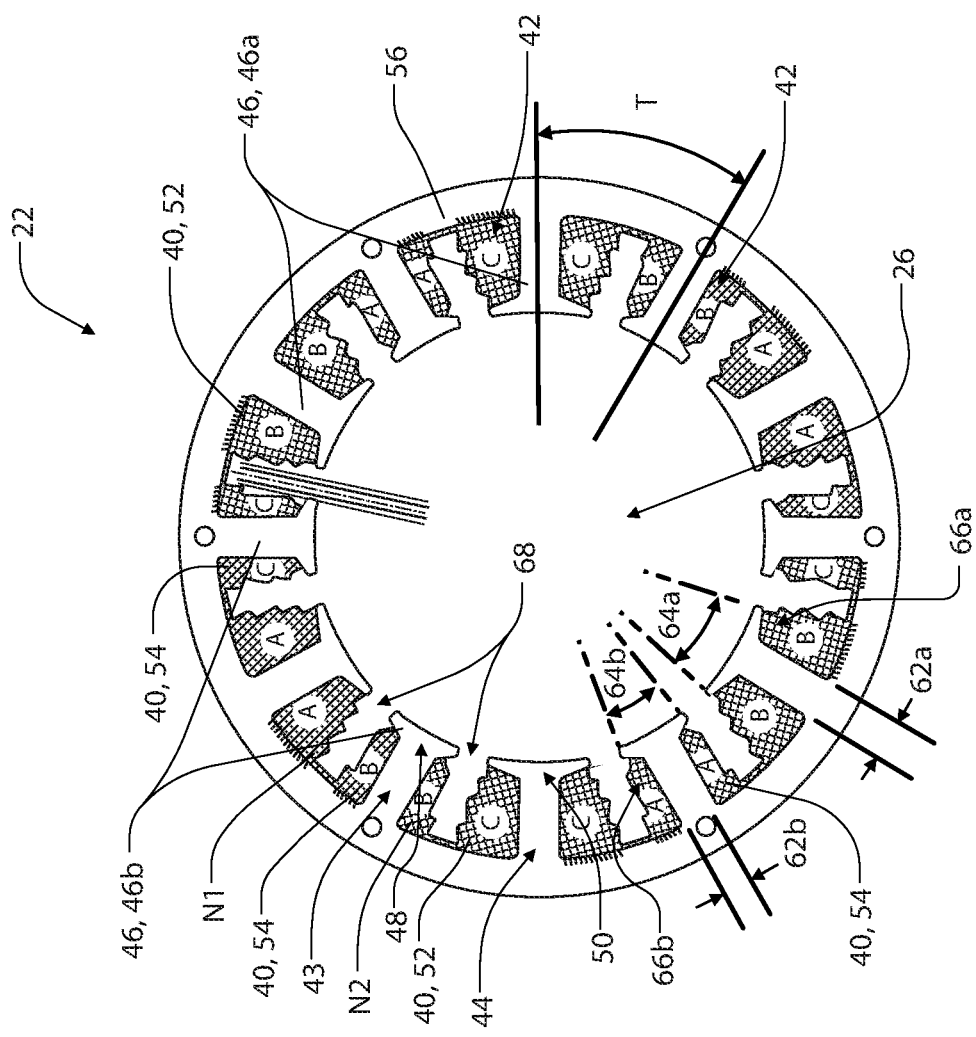
FIG. 3 is a cross-sectional view of a stator of the electric motor demonstrated in FIG. 1 along section line II-II.

Referring now to FIG. 3, an exemplary embodiment of the stator 22 is shown further demonstrating the alternating configuration of the stator coils 40. As discussed herein, hybrid winding configuration of the stator 22 may comprise an uneven distribution or alternating number of the windings 42. For example, each pair of adjacent teeth 60 or neighboring stator coils 40 may have a first tooth 46a and a second tooth 46b. The first tooth 46a may comprise a first stem portion 43a and a first arc portion 48a. The second tooth 46b may comprise a second stem portion 43b and a second arc portion 48b. In this configuration, the first tooth 46a and the second tooth 46b may comprise different dimensions and spacing configured to accommodate the full coil 52 and the partial coil 54, respectively.

As previously discussed, the full coil 52 may comprise a first number of turns N1 and the partial coil 54 may comprise a second number of turns N2. Accordingly, the first number of turns N1 of the full coil 52 may be greater than the second number of turns N2 of the partial coil 54. Additionally, the teeth 46 of the stator 22 may be configured to accommodate the full coil 52 and the partial coil 54. The terms partial and full and as used to describe the windings 42 of the stator coils 40 are intended to communicate a relative proportion of the coils 40 related to the number of turns N of the windings 42 of an exemplary embodiment of the motor 10 and shall not be considered limiting to various structures of the stator 22 and the motor 10.

In an exemplary embodiment, each of the teeth 46 is arranged in an alternating configuration of the first tooth 46a and the second tooth 46b. In order to accommodate the first number of turns N1, each of the first teeth 46a may comprise the first stem width 62a and the first arc length 64a. In this configuration, a first winding slot 66a may be formed by the first arc length 64a extending beyond the first stem width 62a, which may be configured to accommodate the first number of turns N1. Accordingly, the proportions of the first tooth 46a may be configured to accommodate a larger number of the windings 42 than the second tooth 46b.

In order to accommodate the second number of turns N2, each of the second teeth 46b may comprise the second stem width 62b and the second arc length 64b. In this configuration, a second winding slot 66b may be formed by the second arc length 64b extending beyond the second stem width 62b, which may be configured to accommodate the second number of turns N2. In this arrangement, the stem width 62 (e.g. the first stem width 62a) and/or arc length 64 (e.g. the first arc length 64a) of each of the plurality of the adjacent teeth 60 of the stator 22 may be configured in a variety of embodiments to accommodate the different proportions of the first number of turns N1 and the second number of turns N2. Such a hybrid winding scheme may be achieved while efficiently maintaining a relationship of the neighboring teeth 46 and a plurality of stator slots 68 formed therebetween.

The specific proportions and spacing of the teeth 46 of the stator 22 may further be based on a total number of teeth NT of the stator 22. In the exemplary embodiment, the stator 22 comprises 12 teeth (e.g., NT=12). In some embodiments, the number of teeth NT of the stator 22 may differ and may commonly correspond to a multiple of the number of winding phases (e.g., A, B, and C). For example, the number of teeth NT of the stator 22 may comprise 6, 9, 12, 15, etc. Based on the number of teeth NT and the proportions of each of the first teeth 46a and the second teeth 46b, the tooth pitch T may also be determined based on a desired spacing of the teeth 46 and separated by the stator slots 68.

Figure 4:
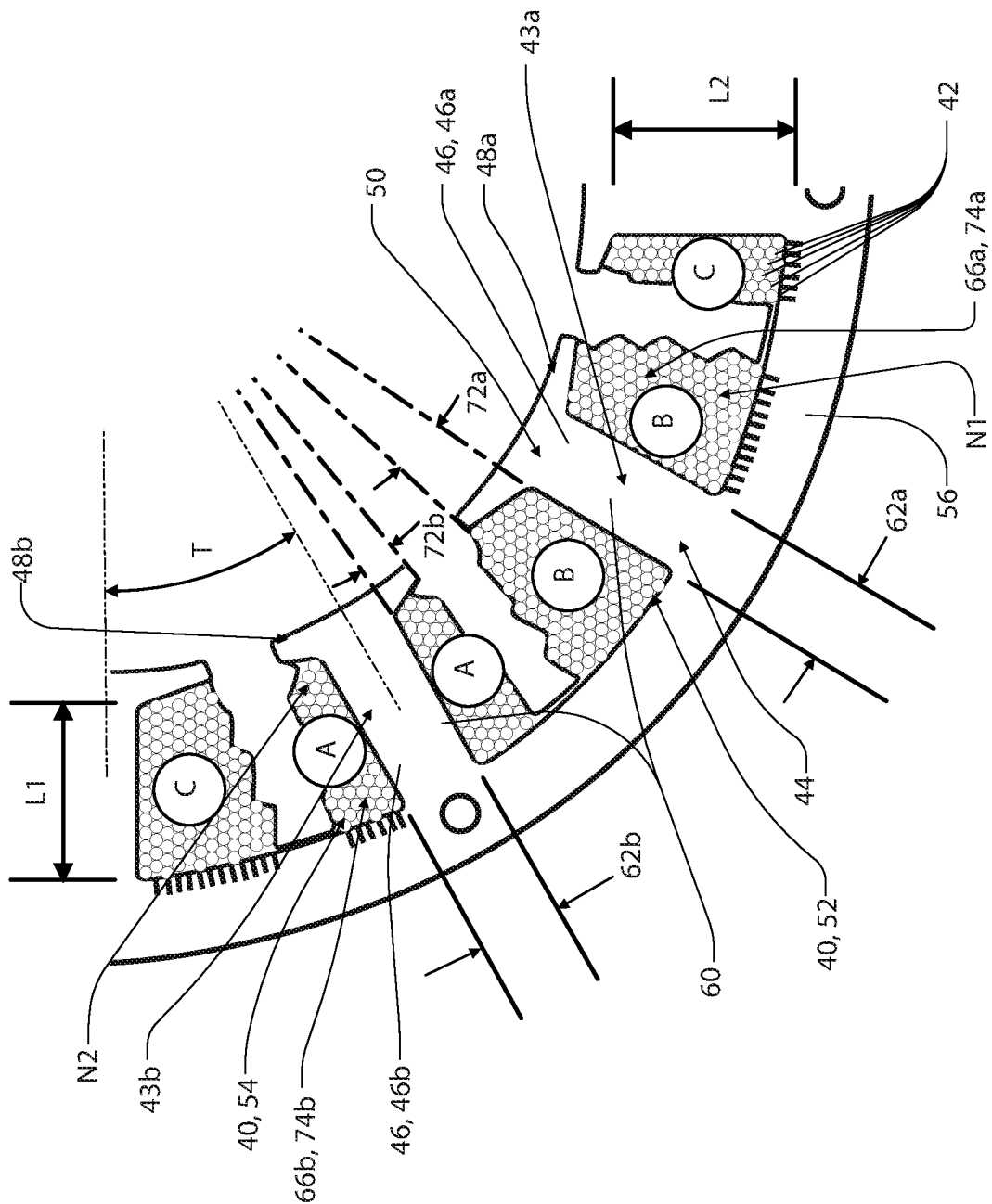
FIG. 4 is a partial cross-sectional view of a stator and the electric motor demonstrated in FIG. 1 along section line II-II in accordance with the disclosure.

Referring to FIG. 4, a detailed cross-sectional view of the stator 22 along section line II-II is shown. As illustrated in FIG. 4, the windings 42 and the pair of the adjacent teeth 60 are shown demonstrating further detail. The first number of turns N1 is shown wrapped around the first winding slot 66a. The first winding slot 66a may be formed by the first stem portion 43a extending from the proximal end portion 44 in connection with the yoke 56 to the distal end portion 50 in connection with the first arc portion 48a. In this configuration, a length L1 of the first tooth 46a in combination with a first extension length 72a or first arm length of the first arc portion 48a may determine the dimensions of an opening formed by the first winding slot 66a. The first winding slot 66a may form a first receiving region 74a configured to receive the first number of turns N1. The representation of the cross-section of the windings 42 demonstrated in FIGS. 2-4 may not correspond to a specific number of turns N of the windings 42 and may be exaggerated in proportions to demonstrate detail.

The second number of turns N2 is shown wrapped around the second winding slot 66b. The second winding slot 66b may be formed by the second stem portion 43b extending from the proximal end portion 44 in connection with the yoke 56 to the distal end portion 50 in connection with the second arc portion 48b. In this configuration, a length L2 of the second tooth 46b in combination with a second extension length 72b or second arm length of the second arc portion 48b may determine the dimensions of an opening formed by the second winding slot 66b. In this configuration, the second winding slot 66b may form a second receiving region 74b configured to receive the second number of turns N2.

Each of the receiving regions 74a and 74b may correspond to openings or areas formed by the winding slots 66a and 66b and configured to receive the windings 42 of the stator coils 40. Accordingly, the receiving regions may be proportioned based on the number of turns of the full coil 52 and the partial coil 54. The first number of turns N1 and the second number of turns N2 of the coils 40 may vary based on the specific design specifications of the motor 10. Additionally, the total number of turns of the windings 42 forming the full coil 52 and the partial coil 54 of the adjacent teeth 60 may be combined to determine a slot fill for a corresponding stator slot 68 between the adjacent teeth 60. Accordingly, the slot fill for each of the stator slots 68 may correspond to the total number of turns of the first number of turns N1 and the second number of turns N2.

For example, in an exemplary embodiment, the first number of turns N1 may be 176 and the second number of turns N2 may be 30. In this configuration, a turn ratio of the first number of turns N1 to the second number of turns N2 may be between 2:1 and 10:1. In some embodiments, the ratio of the first number of turns N1 to the second number of turns N2 may be between 4:1 and 8:1. In this particular example, the approximate ratio of the first number of turns N1 to the second number of turns N2 may be between 5:1 and 7:1 and, more specifically, may be approximately between 5.5:1 and 6.5:1. Accordingly, the ratio of the number of turns N of one or more neighboring pairs of the adjacent teeth 60 may be configured to suit the desired operation of the motor 10.

Similar to the ratio of the number of turns of the first tooth 46a and the second tooth 46b (N1:N2), the dimensions of the first winding slot 66a and the second winding slot 66b may be proportioned commensurate to the turn ratio to accommodate the number of turns N of the full coil 52 and the partial coil 54. For example, if the ratio of the first number of turns N1 of the first tooth 46a to the second number of turns N2 of the second tooth 46b is 6:1, the corresponding ratio of the first receiving region 74a to the second receiving region 74b may also be approximately 6:1. Accordingly, each of the neighboring pairs of the adjacent teeth 60 of the stator 22 may be appropriately sized to accommodate the first number of turns N1 and the second number of turns N2.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

The invention claimed is:

1. A stator for a permanent magnet motor, comprising:
    a yoke comprising an outer support and forming an opening configured to receive a rotor comprising a plurality of permanent magnets disposed in a plurality of rotor slots;
    a first tooth extending into the opening and comprising a first stem portion and a first arc portion, wherein the first arc portion extends from the first stem portion over a first extension length forming a first receiving region configured to accommodate a first number of turns of a first stator coil of a first electrical phase of a power supply; and
    a second tooth extending into the opening adjacent the first tooth and comprising a second stem portion and a second arc portion, wherein the second arc portion extends from the second stem portion over a second extension length forming a second receiving region configured to accommodate a second number of turns of a second stator coil of a second electrical phase of the power supply;
    wherein the first extension length is different than the second extension length, wherein the difference is based on a turn ratio between the first number of turns to the second number of turns, wherein the stator is configured to receive three winding phases comprising the first winding phase, the second winding phase, and a third winding phase, wherein each of the adjacent pairs of the stator teeth comprise two of the three winding phases, and wherein each of the first number of turns and the second number of turns are evenly distributed among the three winding phases connected to the adjacent pairs of stator teeth about the opening formed by the stator.

2. The stator according to claim 1, wherein the turn ratio between the first number of turns to the second number of turns is at least 2:1.

3. The stator according to claim 1, wherein the first tooth and the second tooth form an adjacent pair of stator teeth.

4. The stator according to claim 3, wherein the stator comprises a plurality of the adjacent pairs of the stator teeth distributed around the opening and forming a cylindrical opening configured to receive a rotor.

5. The stator according to claim 4, wherein the plurality of adjacent pairs of the stator teeth are evenly spaced around the opening and separated by a plurality of stator slots.

6. A stator assembly for a permanent magnet motor, comprising:
    a yoke forming an outer support configured to receive a rotor comprising a plurality of permanent magnets disposed in a plurality of rotor slots;
    a plurality of teeth in connection with the yoke and extending into an opening formed by the yoke, the plurality of teeth comprising a first tooth and a second tooth, wherein the first tooth is arranged adjacent to the second tooth about a rotational axis of the motor and wherein:
        the first tooth comprises a first stem portion extending into the opening from the yoke to a first distal end portion forming a first arc portion, wherein the first stem portion and the first arc portion form a first receiving region configured to accommodate the first number of turns of the first coil; and
        the second tooth comprises a second stem portion extending into the opening from the yoke to a second distal end portion forming a second arc portion, wherein the second stem and the second arc form a second receiving region configured to accommodate the second number of turns of the second coil;
    a first coil in connection with a first electrical phase comprising a first conductive winding having a first number of turns disposed around the first tooth;
    a second coil in connection with a second electrical phase comprising a second conductive winding having a second number of turns disposed around the second tooth, wherein the first number of turns is different from the second number of turns; and
    wherein the stator assembly is configured to receive three winding phases comprising the first winding phase, the second winding phase, and a third winding phase, wherein each of the first number of turns and the second number of turns are evenly distributed among the three winding phases connected to the adjacent pairs of stator teeth about the opening formed by the stator.

7. The stator assembly according to claim 6, wherein the plurality of teeth comprise the first tooth and the second tooth formed in a plurality of pairs of adjacent teeth equally spaced around the yoke.

8. The stator assembly according to claim 6, wherein the first number of turns of the first coil comprises at least twice as many turns as the second number of turns.

9. The stator assembly according to claim 6, wherein the first receiving region is larger than the second receiving region.

* * * * *